US009135523B2

(12) United States Patent
Kato et al.

(10) Patent No.: US 9,135,523 B2
(45) Date of Patent: Sep. 15, 2015

(54) APPARATUS, METHOD OF CONTROLLING THE SAME AND STORAGE MEDIUM

(71) Applicant: CANON KABUSHIKI KAISHA, Tokyo (JP)

(72) Inventors: Minako Kato, Kawasaki (JP); Tetsuya Suwa, Yokohama (JP); Takashi Nakamura, Yokohama (JP); Yugo Mochizuki, Kawasaki (JP); Masao Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 13/921,789

(22) Filed: Jun. 19, 2013

(65) Prior Publication Data

US 2014/0010442 A1    Jan. 9, 2014

(30) Foreign Application Priority Data

Jul. 9, 2012 (JP) ................................. 2012-154000

(51) Int. Cl.
| G06K 9/34 | (2006.01) |
| G06K 9/40 | (2006.01) |
| G06K 9/62 | (2006.01) |
| G06K 9/00 | (2006.01) |
| G06K 9/32 | (2006.01) |
| H04N 1/00 | (2006.01) |
| H04N 1/10 | (2006.01) |
| H04N 1/193 | (2006.01) |

(52) U.S. Cl.
CPC .......... *G06K 9/6202* (2013.01); *G06K 9/00442* (2013.01); *G06K 9/3233* (2013.01); *H04N 1/00816* (2013.01); *H04N 1/1013* (2013.01); *H04N 1/193* (2013.01); *H04N 2201/0081* (2013.01); *H04N 2201/0091* (2013.01); *H04N 2201/0094* (2013.01)

(58) Field of Classification Search
CPC .............. G06K 9/6202; G06K 9/3233; G06K 9/00442; H04N 1/00681; H04N 1/00816; H04N 2201/0081; H04N 2201/0091; H04N 2201/0094
USPC .......... 382/164, 219, 266, 312; 358/401, 449, 358/505
See application file for complete search history.

(56) References Cited

U.S. PATENT DOCUMENTS

| 5,287,439 | A |   | 2/1994  | Koga et al. |           |
|-----------|---|---|---------|-------------|-----------|
| 5,384,621 | A | * | 1/1995  | Hatch et al. | ...... 399/42 |
| 5,673,067 | A |   | 9/1997  | Ogawa et al. |          |
| 5,677,725 | A |   | 10/1997 | Honbo et al. |          |
| 5,721,812 | A |   | 2/1998  | Mochizuki   |           |
| 6,292,621 | B1|   | 9/2001  | Tanaka et al. |         |
| 6,466,340 | B1| * | 10/2002 | Washio ................... 358/488 |

(Continued)

FOREIGN PATENT DOCUMENTS

| JP | 07-170405 A | 7/1995 |
| JP | 11-008764 A | 1/1999 |

*Primary Examiner* — Kanjibhai Patel
(74) *Attorney, Agent, or Firm* — Fitzpatrick, Cella, Harper & Scinto

(57) ABSTRACT

The present invention provides an apparatus for processing image data obtained by reading a document and a background image outside the document, and method of controlling the apparatus. The apparatus determines a degree of similarity between a color of the background image and a color of a marginal region of the document from the image data, sets a region extraction parameter based on the determined degree of similarity, and determines a document region by using the region extraction parameter from the image data.

19 Claims, 6 Drawing Sheets

(56) References Cited

U.S. PATENT DOCUMENTS

| | | |
|---|---|---|
| 6,608,926 B1 | 8/2003 | Suwa et al. |
| 6,694,051 B1 | 2/2004 | Yamazoe et al. |
| 6,741,741 B2 * | 5/2004 | Farrell .......................... 382/199 |
| 7,058,222 B2 * | 6/2006 | Li et al. ......................... 382/170 |
| 7,432,985 B2 | 10/2008 | Ishikawa et al. |
| 7,924,469 B2 | 4/2011 | Ono et al. |
| 7,944,588 B2 | 5/2011 | Yamada et al. |
| 7,983,528 B2 | 7/2011 | Sohma et al. |
| 8,175,155 B2 | 5/2012 | Suwa et al. |
| 8,237,991 B2 | 8/2012 | Ono et al. |
| 8,314,980 B2 * | 11/2012 | Makino et al. ................ 358/520 |
| 8,320,696 B2 | 11/2012 | Yamamoto et al. |
| 2008/0112023 A1 * | 5/2008 | Watanabe ..................... 358/514 |
| 2012/0268759 A1 | 10/2012 | Ono et al. |

\* cited by examiner

| 1 | 1 | 1 |
|---|---|---|
| 1 | -8 | 1 |
| 1 | 1 | 1 |

| 2 | 2 | 2 |
|---|---|---|
| 2 | -16 | 2 |
| 2 | 2 | 2 |

APPARATUS, METHOD OF CONTROLLING THE SAME AND STORAGE MEDIUM

BACKGROUND OF THE INVENTION

1. Field of the Invention

The present invention relates to an apparatus which detects a document region from the image signal obtained by reading a document placed on a platen and a method thereof.

2. Description of the Related Art

There is known an image reading apparatus (scanner) which optically reads a document, photograph, or the like and converts the read image into electronic data. Some of such scanners and some applications designed to process read images have a function called a crop, which cuts out part of an image. This crop function includes a manual crop of allowing the user to cut out an arbitrary region while seeing the screen, and an automatic crop that is independent of user designation.

A conventional automatic crop function reads an image of a document in a region equivalent to a platen and detects the edge of the document based on a difference in color such as luminance and chroma in the read image or by an edge extraction filter, thereby extracting an image region on the document.

Japanese Patent Laid-Open No. 7-170405 discloses a technique of detecting a document region by detecting a signal representing the shadow of the edge of a document based on a density value from the image signal obtained from the document. Japanese Patent Laid-Open No. 11-008764 discloses a technique of extracting only the image data of a document portion by switching thresholds for detecting a document region in accordance with a read position when detecting a document region from the image data obtained by reading the document.

If a document is a photographic document, since the entire surface of the document is colored, it is easy to crop upon detecting only a document portion. This is because the cover of a platen as the background of a read image is generally white, and hence it is easy to discriminate a document portion from a background portion.

To the contrary, many text documents have margins, so it is not easy to discriminate a document portion of an original text document from a background portion. For this reason, cropping only an image portion of the original text document may change the size of the text document or divide the text document into a plurality of regions depending on a document image. In such a case, the read image data differs in layout from the original text document.

SUMMARY OF THE INVENTION

An aspect of the present invention is to eliminate the above-mentioned problems with the conventional technology.

In consideration of the above points, a feature of the present invention is to improve the accuracy of determining a document region from image data including a document image and a background image outside the document.

According to an aspect of the present invention, there is provided an apparatus for processing image data obtained by reading a document and a background image outside the document, the apparatus comprising: a similarity determination unit configured to determine a degree of similarity between a color of the background image and a color of a marginal region of the document from the image data; a setting unit configured to set a region extraction parameter based on the degree of similarity determined by the similarity determination unit; and a document determination unit configured to determine a document region by using the region extraction parameter from the image data.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Although this embodiment will exemplify a reading apparatus (scanner) as a discrete apparatus which functions as an image processing apparatus, the embodiment can also be applied to a multifunction peripheral including a printing apparatus as well as a scanner.

Figure 1:
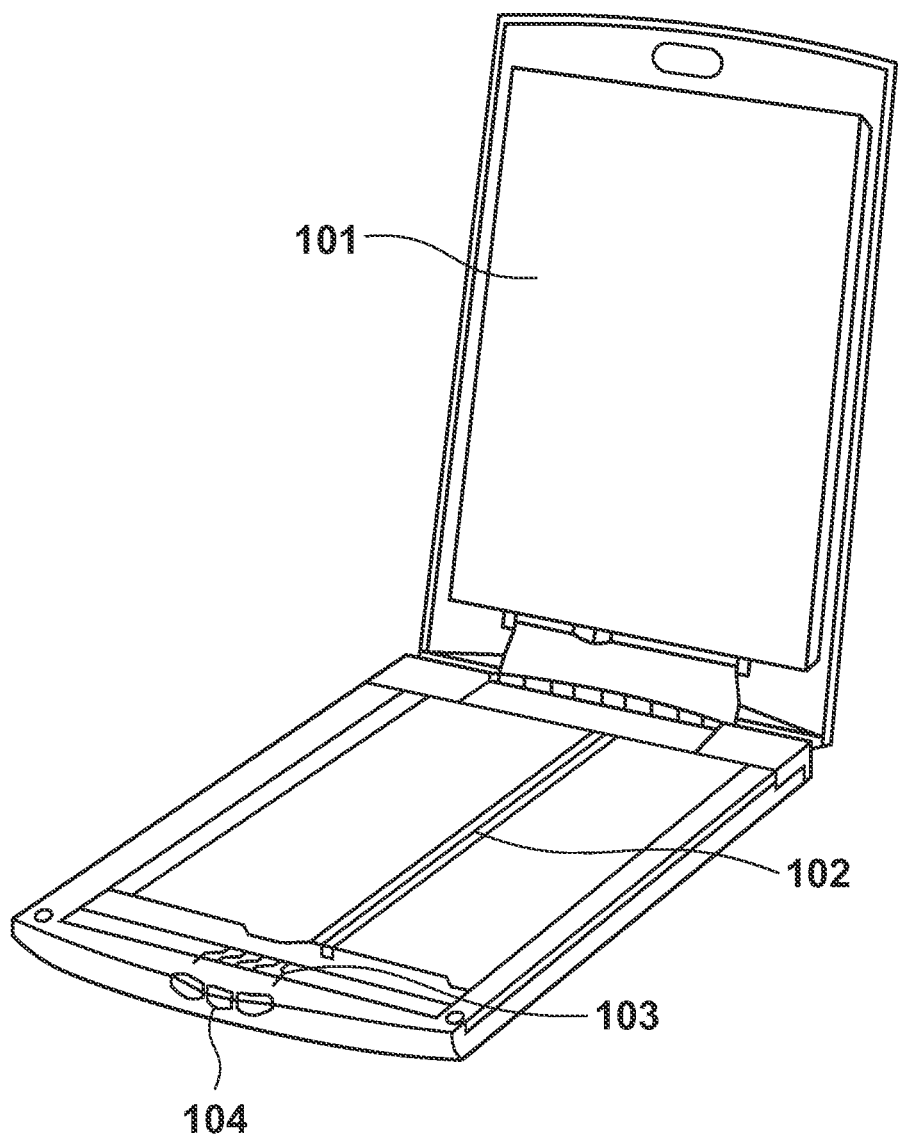
FIG. 1 depicts a schematic perspective view of a reading apparatus (scanner) according to an embodiment.

FIG. 1 is a schematic perspective view of a reading apparatus (scanner) according to a first embodiment.

Referring to FIG. 1, a platen cover 101 is used to press downward the document placed on a platen 102. A document read unit 103 reads a document placed on the platen 102 by scanning the document while irradiating it with light from below. The surface of the platen cover 101 which is irradiated with the above light is white. Reference numeral 104 denotes a scanner button key for starting to scan a document. When the user presses the scanner button key 104 after placing a document on the platen 102 and pressing the document with the platen cover 101, a motor (not shown) rotates to convey the document read unit 103. The light source provided on the document read unit 103 irradiates the document from below. A sensor (not shown) for detecting reflected light from the document reads a document image. The following will describe the processing for discriminating a document portion from the platen cover 101 (background image) existing outside the document (for discriminating the boundary between a document image and a background image) when reading the document having a marginal region near an end portion, with characters and graphic patterns being printed on white plain paper. In this case, the plain paper is so thin that the edge of the document does not easily form a shadow. This processing is therefore performed in consideration of this.

Figure 2:
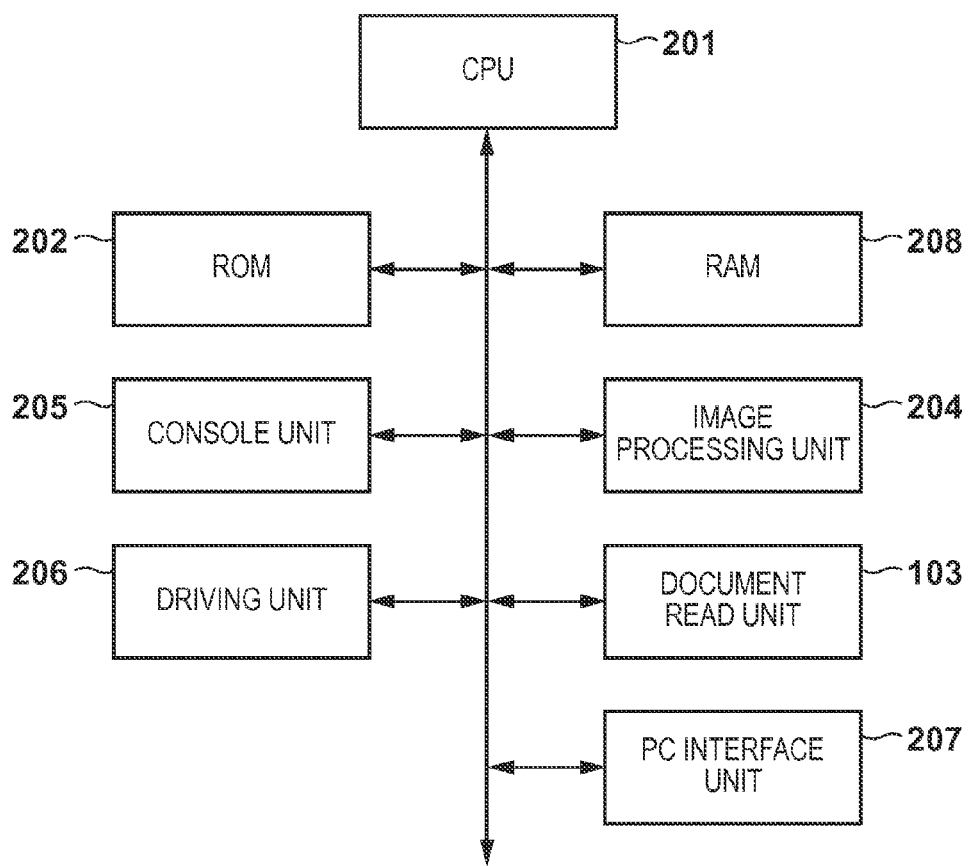
FIG. 2 is a block diagram showing the internal arrangement of a scanner according to the embodiment.

FIG. 2 is a block diagram showing the internal arrangement of the scanner according to the first embodiment.

Referring to FIG. 2, a CPU 201 controls the operation of the scanner in accordance with a program stored in a ROM 202. The ROM 202 also stores various values and mathematical expressions used for processing such as shading. The document read unit 103 shown in FIG. 1 reads a document image and outputs red (R), green (G), and blue (B) analog luminance data. An image processing unit 204 performs image processing such as correcting a read image signal value (image data) obtained by digitizing the analog luminance data by A/D conversion and encoding the image. When it is necessary to store data when performing this image processing, a RAM 208 is temporarily used. The RAM 208 is also used as a work area for the CPU 201. A console unit 205 includes the scanner button key 104 (FIG. 1). Upon detecting the pressed state of the key, the console unit 205 outputs the detection signal to the CPU 201. A driving unit 206 includes a driver circuit which controls the rotation of the motor for moving the document read unit 103. A PC interface unit 207 is an interface for a PC as an external device. This scanner can transfer data between itself and the PC via the PC interface unit 207. Note that when it is necessary to buffer data at the time of data transfer, the RAM 208 is used.

Figure 3:
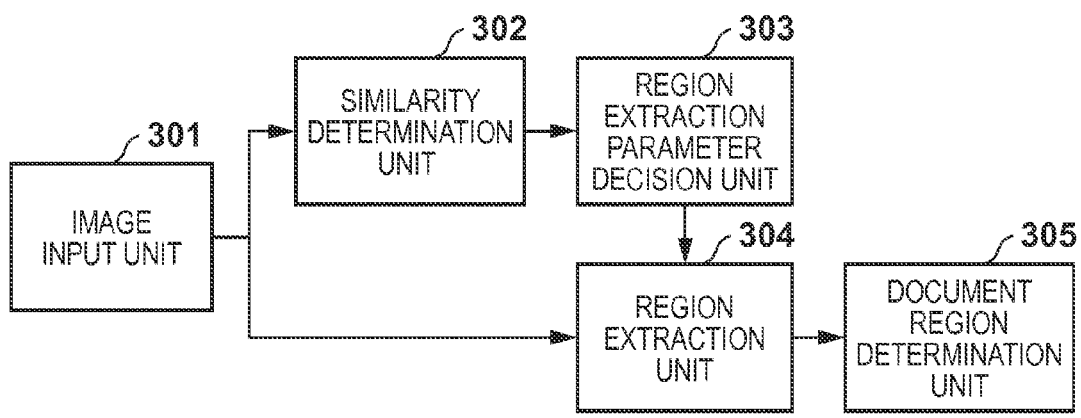
FIG. 3 is a functional block diagram showing the functional arrangement of the image processing unit of the scanner according to the embodiment.
Figure 8:
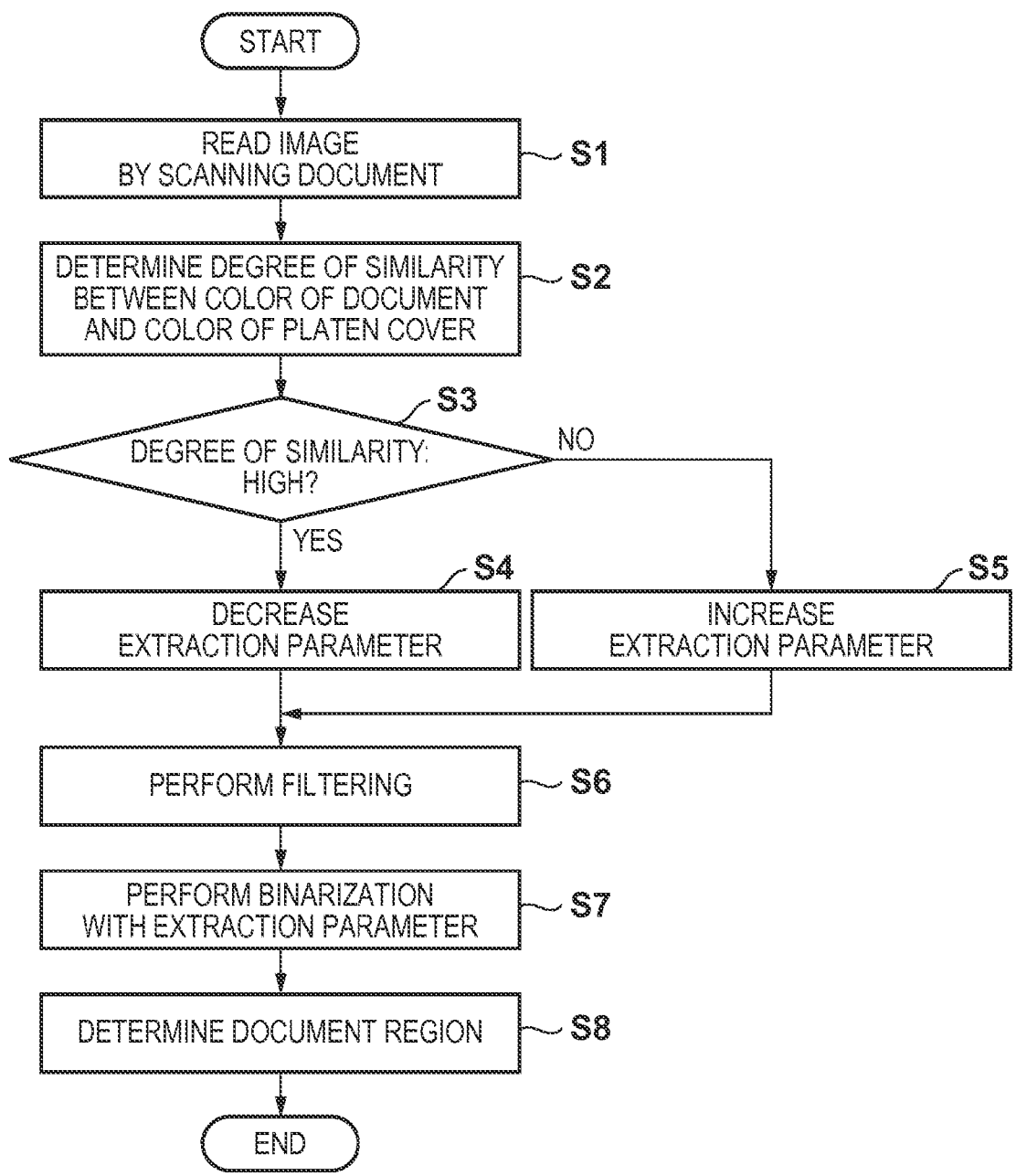
FIG. 8 is a flowchart for describing document region detection processing by the scanner according to the first embodiment.

FIG. 3 is a functional block showing the functional arrangement of the image processing unit 204 of the scanner according to the first embodiment. The image processing unit 204 executes processing for determining a document region from a digitalized read image signal. The image processing unit 204 includes an image input unit 301, a similarity determination unit 302, a region extraction parameter decision unit 303, a region extraction unit 304, and a document region determination unit 305. Note that the function of the image processing unit 204 may be implemented by a program executed by the CPU 201 as shown in the flowchart of FIG. 8.

When reading a document, the user places the document on the platen 102, closes the platen cover 101, and presses the scanner button key 104. With this operation, the image input unit 301 inputs the image signal obtained by scanning the entire surface (read permitted region) of the platen 102. In this manner, the apparatus reads the document and the platen cover 101 to obtain an image including a background image and a document image. The similarity determination unit 302 roughly detects a background portion and a document portion from the input image, and determines a degree of similarity which indicates how much the document image is similar to the background image. This method of determining a degree of similarity will be described later. Note that the region extraction unit 304 executes the processing of detecting a document region and a background region. The region extraction parameter decision unit 303 determines a parameter to be used for region extraction processing by the region extraction unit 304 based on the degree of similarity determined in this manner. This processing of determining the region extraction parameter will be described in detail later. The region extraction unit 304 executes region extraction processing based on the determined region extraction parameter. Upon receiving the region extraction processing result, the document region determination unit 305 determines the final document range. Extracting a document portion by accurately detecting the end portion of the document (the boundary between the document and the platen portion) can acquire a read image identical in layout to the original document.

The similarity determination unit 302 will be described in detail next.

A degree of similarity is a measure indicating how much the color of the document is similar to that of the platen cover 101. It is possible to use the difference in spectral reflectance characteristics between the platen cover 101 and the plain paper for the determination of a degree of similarity.

Figure 4:
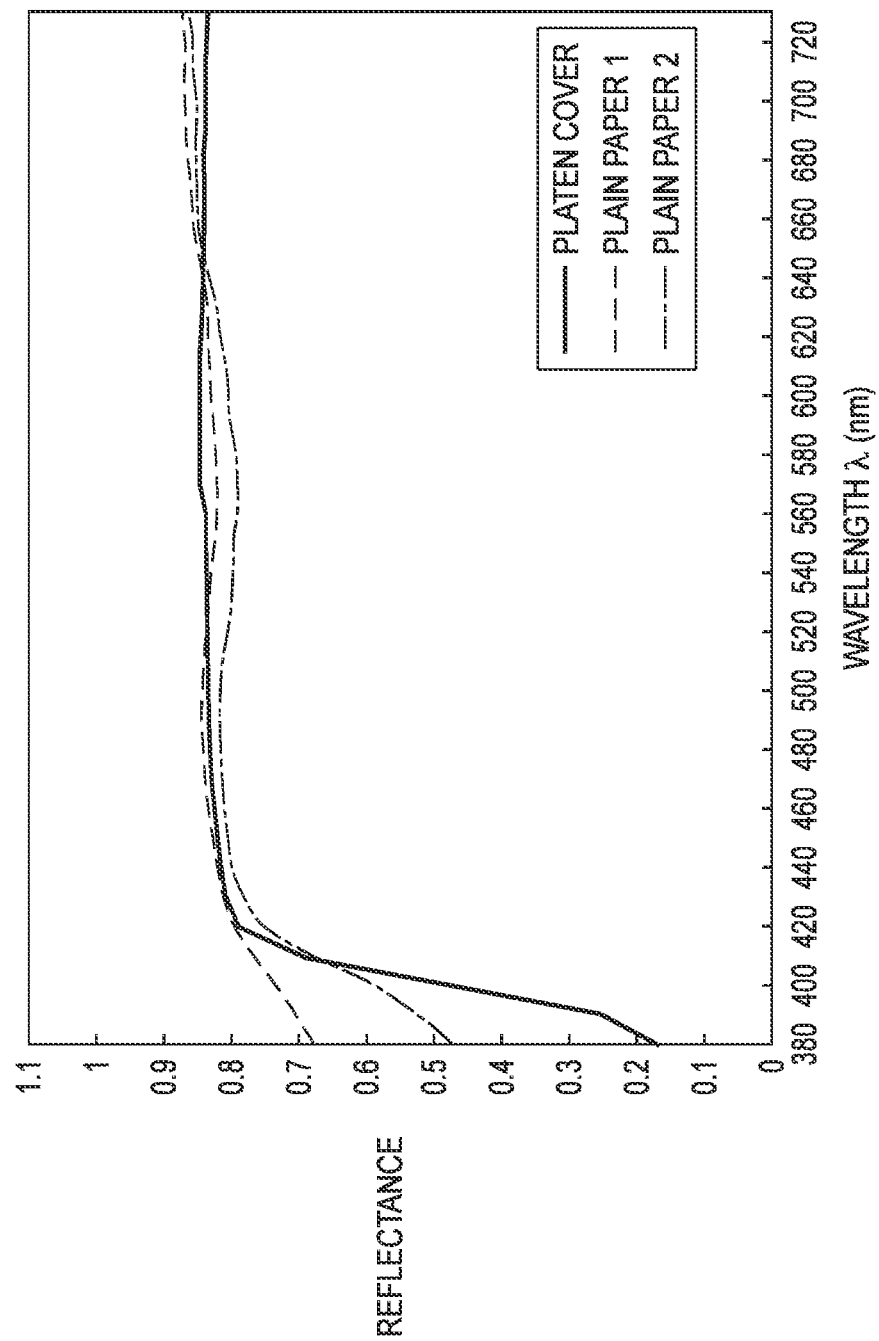
FIG. 4 depicts a view illustrating a graph showing the spectral reflectance spectra of a platen cover and two types of plain paper.

FIG. 4 depicts a view illustrating a graph showing the spectral reflectance spectra of the white portion of the platen cover 101 and the white portions of two types of plain paper. Referring to FIG. 4, the abscissa axis represents the wavelengths of light, and the ordinate axis represents the reflectance at each wavelength.

The white portions of the platen cover 101 and plain paper are both white with high luminance. For this reason, it is almost impossible to detect a difference in color based on general reflection density (OD (optical density)). In contrast, spectral reflectance spectra can detect differences like those shown in FIG. 4. The platen cover 101 exhibits an almost flat reflectance in the wavelength region of visible light. In contrast to this, plain paper exhibits a tendency to a slight decrease in reflectance near green (wavelength: 500 to 560 nm). In addition, plain paper 1 and plain paper 2 differ in the amount of decrease in reflectance near green. The similarity determination unit 302 determines the degree of similarity between the color of a background image and the color of plain paper by using this phenomenon.

In this case, a background image corresponds to the white portion of the platen cover 101 which exists outside the document placed on the platen 102 and is obtained by reading a predetermined region of the platen 102 while the platen cover 101 is closed. As is obvious from FIG. 4, plain paper 1 exhibits a spectrum more similar to that of the platen cover 101 than plain paper 2. It can therefore be said that the degree of similarity of plain paper 1 to the platen cover 101 is higher than that of plain paper 2. In this case, more specifically, the degree of similarity is decided depending on the magnitudes of the differences in output density between R, G, and B signals by using the shapes of reflectance spectra. When comparing R and G signal values, the smaller the differences, the higher the degrees of similarity, and vice versa. In this case, for example, the degrees of similarity are classified into three levels, namely high, intermediate, and low. In the first embodiment, plain paper 1 is determined as "degree of similarity: high", and plain paper 2 is determined as "degree of similarity: low". Note that being similar in spectrum indicates being similar in color, whereas not being similar in spectrum indicates being different in color. In this case, the white portion of a document is a region with a color similar to white (for example, a region existing in the form of a rectangular frame) which continuously exists outside a region (outer circumference) where a colored image exists. The white portion of the platen cover 101 is acquired from the end portion of an image in a region which is obtained by reading.

The region extraction parameter decision unit 303 and the region extraction unit 304 will be described next.

The first embodiment will exemplify a case in which the region extraction unit 304 performs edge detection processing by filtering, and a region extraction parameter is set as a quantization threshold for determining whether an image after filtering is an edge or a portion other than an edge.

Figure 5:
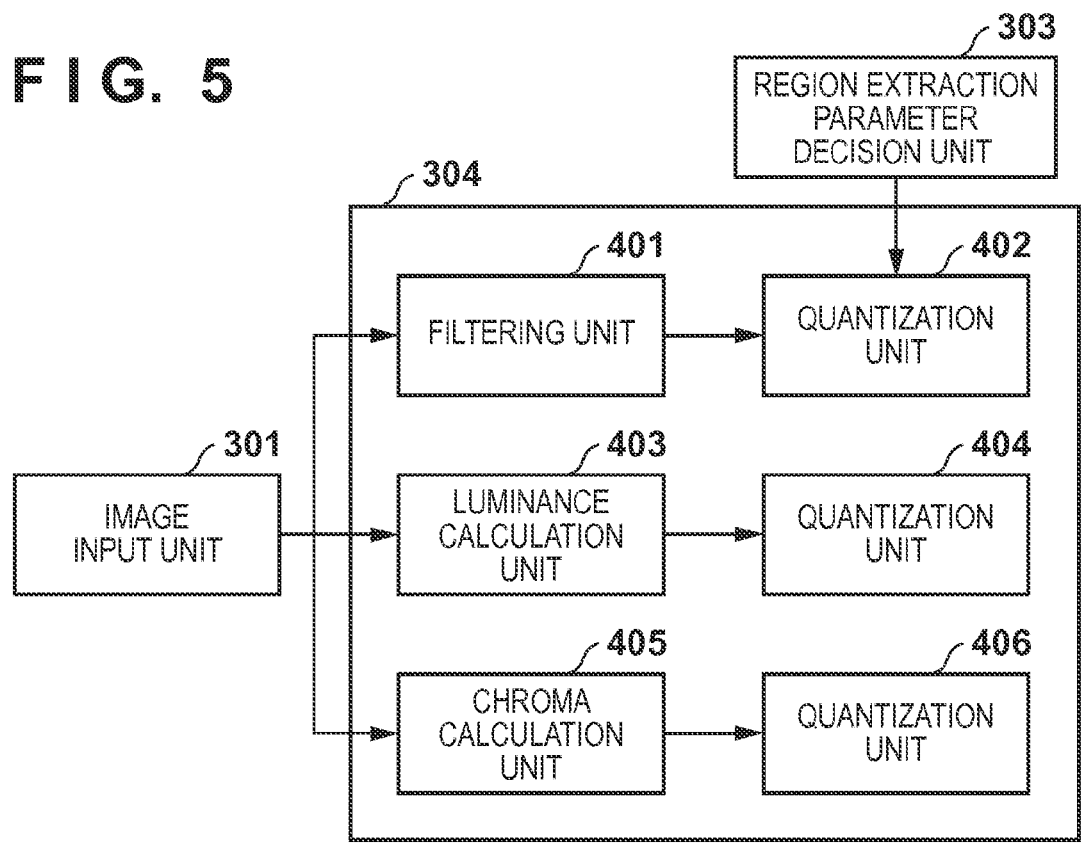
FIG. 5 is a functional block diagram for explaining the function of a region extraction unit according to a first embodiment.

FIG. 5 is a functional block diagram for explaining the function of the region extraction unit 304 according to the first embodiment.

The region extraction unit 304 includes a filtering unit 401, a quantization unit 402 for quantizing the filtering result, a luminance calculation unit 403, a quantization unit 404 for quantizing the calculation result of the luminance calculation unit 403, a chroma calculation unit 405, and a quantization unit 406 for quantizing the calculation result of the chroma calculation unit 405. The parameter determined by the region extraction parameter decision unit 303 is set in the quantization unit 402 for the data of an image after filtering. The apparatus performs region extraction by a determination based on luminance or chroma or the like together with edge detection processing by filtering. Combining a plurality of detection results in this manner can improve the detection accuracy.

Edge extraction processing by filtering will be described in more detail next.

Figure 6:
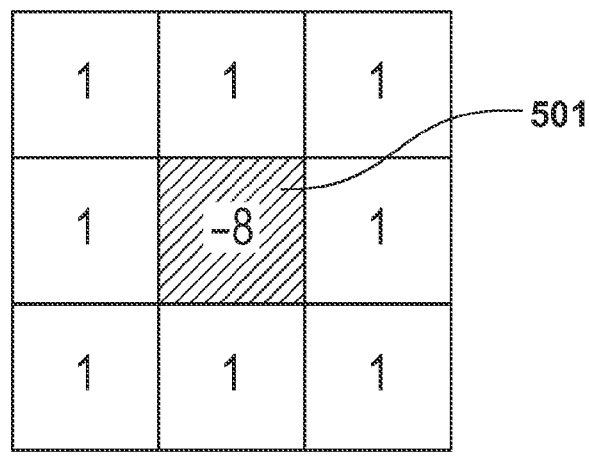
FIG. 6 depicts a view showing a concrete example of a Laplacian filter for edge extraction.

It is possible to implement edge extraction processing by filtering by using a first derivation filter or second derivation filter and further quantizing the image data after filtering with a specific threshold. As an edge detection filter, for example, the Laplacian filter shown in FIG. 6 is used. Referring to FIG. 6, reference numeral 501 denotes a target pixel. Filtering is performed for the eight surrounding pixels in accordance with the coefficients shown in FIG. 6. This filtering is implemented by product-sum operation of the pixel values and the coefficients. As a result, the apparatus obtains image data with only the edge portion being enhanced. Note that the apparatus may apply this filtering to each of the R, G, and B signal values of acquired pixel values or may convert the R, G, and B signal values into a luminance signal Y at proper combining ratios of the R, G, and B signal values and execute the filtering based on the signal.

The r quantization unit 402 binarizes the image data after the filtering with the parameter (threshold) determined based on the degree of similarity to the platen cover 101. This determines an edge and a portion other than the edge. In this case, a portion with a value equal to or more than the threshold is determined as an edge portion, and other portions are determined as not being the edge portion. When filtering R, G, and B signal values, the apparatus may perform binarization processing for each value and determine a portion as an edge if either of the values is equal to or more than a threshold.

A threshold for binarization processing will be described next.

In this case, the larger the threshold, the lower the edge extraction intensity, and vice versa. Increasing the edge extraction intensity, however, will extract much noise such as dust and stain.

Note that being high in the degree of similarity between the color of a document and that of the platen cover 101 indicates that the color of the platen cover 101 is almost identical to that of the document. In this case, it is difficult to discriminate the background image from the document image. For this reason, it is difficult to detect a region based on luminance or chroma, and it is necessary to detect a document region by document edge extraction by filtering. It is therefore necessary to provide a threshold so as to increase the edge extraction intensity. More specifically, the apparatus decreases (reduces) the binarization threshold for an image upon filtering to extract even a slight stepped portion as a document edge.

In contrast, being low in degree of similarity indicates that the color of the document is slightly different from that of the platen cover 101. It is possible to detect the difference between a background image and a document image to a certain degree regardless of whether they differ in luminance or chroma. This relatively reduces the role of a filter for document edge extraction. This makes it possible to reduce erroneous detection of noise by decreasing the edge extraction intensity. More specifically, the apparatus extracts only a clear, strong edge by raising (increasing) the binarization threshold for an image after the application of filtering, thereby avoiding the extraction of a document edge due to noise.

A threshold for binarization processing is set in advance for each level of degree of similarity. A threshold for binarization may be decided with reference to the divergence degree between the color of the platen cover 101 and the color of general plain paper. The threshold for binarization may be increased with an increase in the divergence between the color of the platen cover 101 and the color of plain paper as in a case in which the platen cover 101 is made of a special material. In addition, the apparatus determines such a threshold, as needed, depending on the noise amount of an optical system such as a sensor, the amount of noise such as dust and the like on the platen cover 101 and the platen 102, the intensity of light from a light source, and the like.

FIG. 8 is a flowchart for describing detection processing for a document region by the scanner according to the first embodiment. The ROM 202 stores a program for executing this processing. The CPU 201 executes this program to implement this processing.

First of all, in step S1, the CPU 201 controls the document read unit 103 to read a document placed on the platen 102. The image input unit 301 inputs the image signal (image data) obtained in this manner. The flow then advances to step S2, in which the CPU 201 determines the degree of similarity between the color of the white portion of the document and the color of the white portion of the platen cover 101 from the image signal obtained by reading. The process advances to step S3. If the CPU 201 determines in step S3 that these two colors are similar (the degree of similarity is high), the process advances to step S4, in which the CPU 201 decreases the extraction parameter (the above threshold for binarization processing) used for region extraction. If the CPU 201 determines in step S3 that the two colors are not similar (the degree of similarity is low), the process advances to step S5, in which the CPU 201 increases the extraction parameter (the above threshold for binarization processing) used for region extraction.

When the CPU 201 executes step S4 or S5, the process advances to step S6 to perform document determination (document region determination). The CPU 201 then executes filtering for the image signal input in step S1. The process then advances to step S7, in which the CPU 201 binarizes the image signal having undergone filtering by using the extraction parameter determined in step S4 or S5. This makes it possible to detect the boundary between the document and the platen cover 101. In step S8, therefore, the CPU 201 determines a document region and terminates the processing. If necessary, the CPU 201 may perform crop processing of extracting only the image data of the document region in step S8. The apparatus outputs the image data of the cropped document region to an external apparatus such as a PC via the PC interface unit 207. If the scanner includes a printing apparatus, the printing apparatus prints this data on a printing medium.

As described above, according to the first embodiment, the apparatus determines the degree of similarity between the color of the platen cover 101 and the color of a document based on their spectra, and determines a threshold for the detection of a document region based on the degree of similarity. This makes it possible to set a proper quantization threshold for each document, accurately determine a document region, and accurately cut out the document image. This can implement accurate region extraction with less erroneous detection due to noise and the like.

Second Embodiment

The first embodiment has exemplified the case in which the apparatus performs processing corresponding to the degree of similarity between the color of the platen cover 101 and the color of a document by changing the threshold for quantization processing for edge extraction by filtering. However, the parameter depending on a degree of similarity is not limited to the quantization threshold for edge extraction. Filtering itself may be changed. The second embodiment will be described below with reference to FIGS. 7A to 7C. The same reference numerals denote the same constituent elements as those in the first embodiment.

Figures 7A, 7B, 7C:
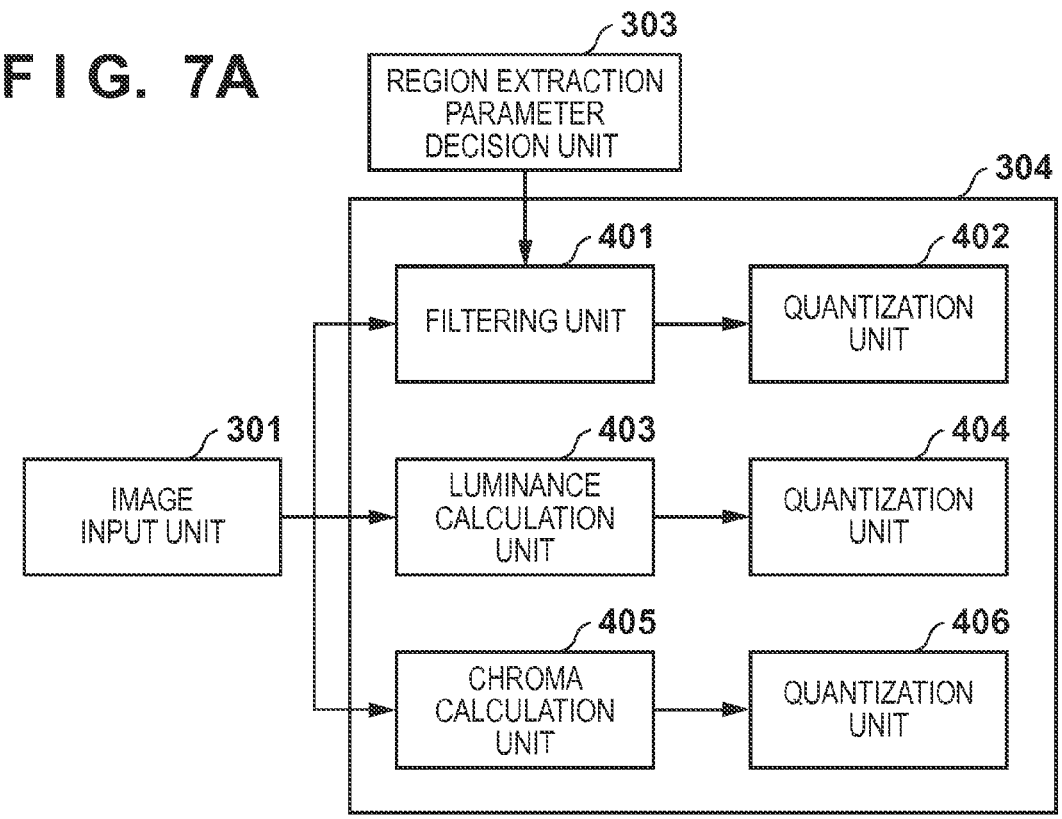
FIG. 7A is a functional block diagram for explaining the function of a region extraction unit according to a second embodiment of the present invention.
FIGS. 7B and 7C depict views each showing a filter example provided for the region extraction unit.

FIG. 7A is a functional block diagram for illustrating the function of a region extraction unit 304 according to the second embodiment of the present invention. The same reference numerals denote components common to those in FIG. 5 described above, and a description of them will be omitted. The arrangement of a scanner according to the second embodiment is the same as that in the first embodiment described above.

The second embodiment differs from the first embodiment described above in that the region extraction parameter determined by a degree of similarity designates a filter to be provided for a filtering unit 401.

FIGS. 7B and 7C each show a view illustrating an example of a filter. If the degree of similarity is low, the apparatus uses a filter like that shown in FIG. 7B which has low detection intensity. If the degree of similarity is high, the apparatus uses a filter like that shown in FIG. 7C which has high detection intensity.

In this case, in the flowchart of FIG. 8 described above, for example, the apparatus can implement the above operation by using the filter shown in FIG. 7C in step S4, and the filter shown in FIG. 7B in step S5. These filters are both edge enhancement filters.

Note that the filters to be used are not limited to those shown in FIGS. 7B and 7C. For example, the apparatus may use first derivation filters or different filters in accordance with a degree of similarity. In any case, it may be possible to set filters which can extract edges and have different edge intensities.

As described above, according to the second embodiment, the apparatus determines the degree of similarity between the color of a platen cover 101 and the color of a document based on their spectra, and determines a filter coefficient for filtering for the detection of a document region based on the degree of similarity. This makes it possible to execute proper filtering for each document, accurately determine a document region, and accurately cut out a document image. This can implement accurate region extraction with less erroneous detection due to noise and the like.

Although the above embodiment is configured to extract a document image by causing a CPU 201 of the scanner to execute the flowchart of FIG. 8, the present invention is not limited to this. The same effect may be obtained by causing the PC connected to the scanner via a PC interface unit 207 to execute the flowchart of FIG. 8. In this case, the PC includes a CPU and a memory. The CPU of the PC executes a program (scanner driver) installed in the memory to make the scanner read a document image. The PC then acquires the result. In this case, the PC functions as an image processing apparatus.

According to the above embodiments, it is possible to accurately determine a document region because a document region is determined by using an extraction parameter corresponding to the degree of similarity between the color of a background image and the color of the document.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium). The above described processing is not implemented by a software, and a part or the entirety of the processing may be implemented by a hardware such as an ASIC and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-154000, filed Jul. 9, 2012, which is hereby incorporated by reference herein in its entirety.

What is claimed is:

1. An apparatus for processing image data obtained by reading a document and a background image outside the document, the apparatus comprising:
   one or more processors;
   a memory configured to store program data executed by the one or more processors;
   a similarity determination section configured to determine a degree of similarity between a color of the background image and a color of a marginal region of the document from the image data;
   a region extraction parameter section configured to set a region extraction parameter based on the degree of similarity determined by the similarity determination unit; and
   a document determination section configured to determine a document region by using the region extraction parameter from the image data.

2. The apparatus according to claim 1, wherein the document determination section determines the document region by quantizing filtered image data by using the region extraction parameter set by the region extraction parameter section after execution of filtering of the image data by a predetermined filter.

3. The apparatus according to claim 2, further comprising a decision section configured to decide one of a plurality of filters in accordance with the degree of similarity determined by the similarity determination section, wherein the document determination section performs filtering for the image data by using a filter decided by the decision section.

4. The apparatus according to claim 1, wherein the document determination section determines the degree of similarity based on spectral reflectance spectra of a white portion of the background image and a white portion of the document.

5. The apparatus according to claim 4, wherein the similarity determination section determines the degree of similarity depending on magnitudes of a difference between R and G output values based on the spectral reflectance spectra,
and wherein the similarity determination section determines a higher degree of similarity, in a case where the difference between R and G output values becomes smaller.

6. The apparatus according to claim 1, wherein the region extraction parameter section sets the region extraction parameter in a case in which the degree of similarity is higher, as a parameter for extracting image data with high luminance which is not extracted by the region extraction parameter in a case in which the degree of similarity is low.

7. The apparatus according to claim 1, wherein the document determination section determines a document region based on image data obtained by executing filtering for the image data by using an edge enhancement filter.

8. The apparatus according to claim 1, wherein the document determination section determines the document region based on luminance and/or chroma of the image data.

9. The apparatus according to claim 1, wherein the image data is obtained by reading in a state that the document is placed on a platen and a platen cover covers the document.

10. A method of processing image data obtained by reading a document and a background image outside the document, the method comprising the following steps performed by one or more processors:
   determining a degree of similarity between a color of the background image and a color of a marginal region of the document from the image data;
   setting a region extraction parameter based on the determined degree of similarity; and
   determining the document region by using the region extraction parameter from the image data.

11. The method according to claim 10, wherein a document region is determined by quantizing filtered image data by using the set region extraction parameter after execution of filtering of the image data by a predetermined filter.

12. The method according to claim 11, wherein one of a plurality of filters is decided in accordance with the set degree of similarity, and
   a document region is determined by performing filtering for the image data by using a decided filter.

13. The method according to claim 10, wherein a degree of similarity is determined based on spectral reflectance spectra of a white portion of the background image and a white portion of the document.

14. The method according to claim 13, wherein a degree of similarity is determined depending on magnitudes of a difference between R and G output values based on the spectral reflectance spectra, and wherein a degree of similarity is determined to be higher, in a case where the difference between R and G output values becomes smaller.

15. The method according to claim 10, wherein the region extraction parameter in a case in which the degree of similarity is high is set as a parameter for extracting image data with high luminance which is not extracted by the region extraction parameter in a case in which the degree of similarity is low.

16. The method according to claim 10, wherein a document region is determined based on image data obtained by executing filtering for the image data by using an edge enhancement filter.

17. The method according to claim 10, wherein the document region is determined based on luminance and/or chroma of the image data.

18. A non-transitory computer-readable storage medium storing a program for causing a computer to execute a method defined in claim 10.

19. The method according to claim 10, wherein the image data is obtained by reading in a state that the document is placed on a platen and a platen cover covers the document.

\* \* \* \* \*